United States Patent [19]

Frielinghaus

[11] 4,058,279

[45] Nov. 15, 1977

[54] FLAT WHEEL DETECTOR

[75] Inventor: Klaus H. Frielinghaus, Rochester, NY

[73] Assignee: General Signal Corporation, Rochester, N.Y.

[21] Appl. No.: 745,702

[22] Filed: Nov. 29, 1976

[51] Int. Cl.² .............................................. B61K 9/12
[52] U.S. Cl. .................................. 246/169 R; 73/146; 246/249
[58] Field of Search .................. 73/146, 8; 246/169 R, 246/128, 249, 40, 41, 54, 246, 122, 129, 34 R, 89

[56] References Cited

U.S. PATENT DOCUMENTS 3,844,513  10/1974  Bernhardson et al. .......... 246/169 R Primary Examiner—Donald O. Woodiel
Attorney, Agent, or Firm—Milton E. Kleinman; John Ohlandt

[57] ABSTRACT

Apparatus for detecting the presence of flat wheels on railroad cars, comprising a high frequency transmitter or source connected so that the rail feed points are staggered or offset with respect to the detector apparatus. As a result, the transmitter cannot be completely shorted by a wheel axle; also, the stagger arrangement permits the overlap of two test sections so that no part of the wheel circumference is missed by the detector. Also the use of current detection of the transmitted signal minimizes loading effects on the received signal by adjacent wheel axle sets.

5 Claims, 2 Drawing Figures

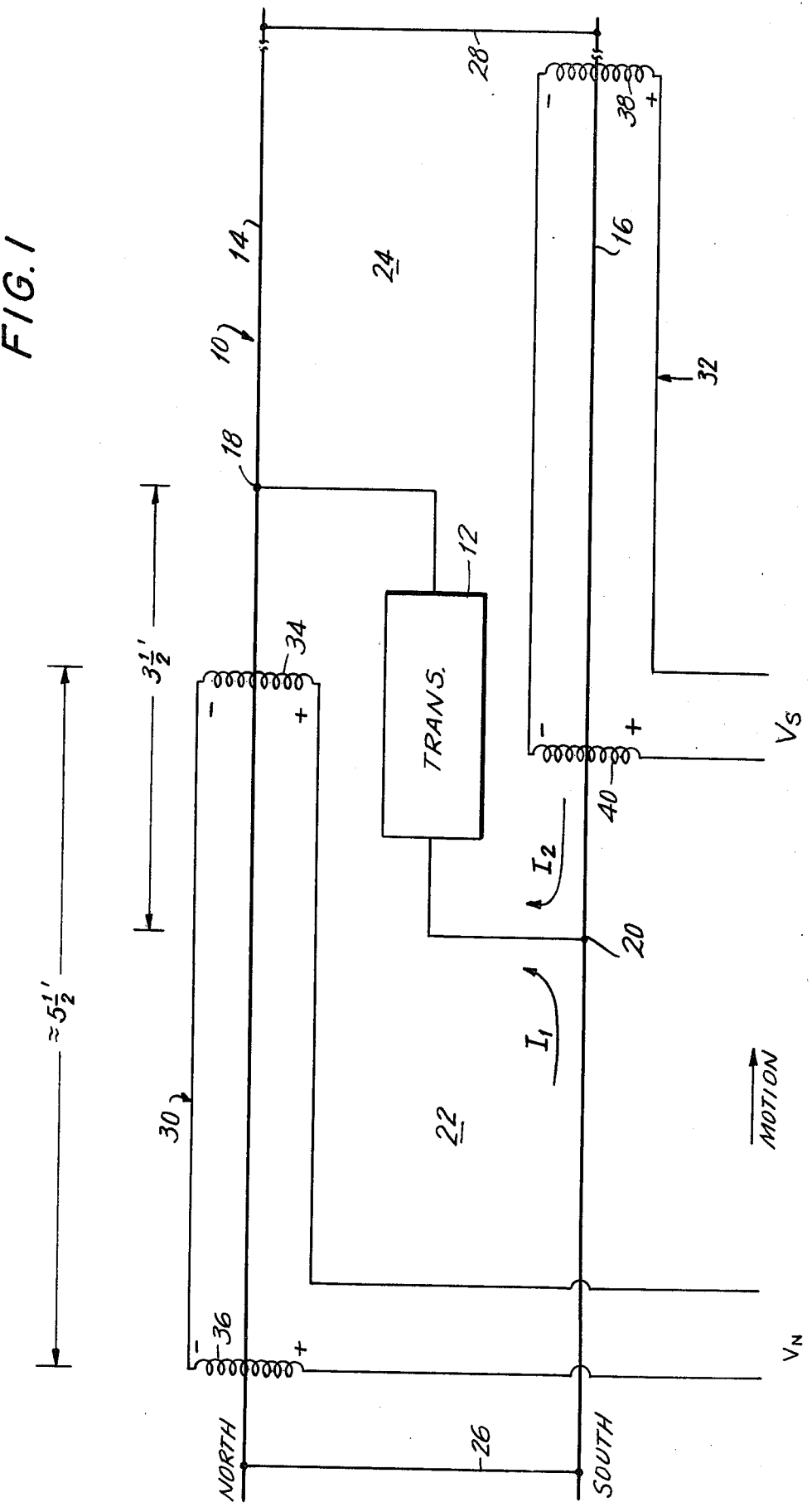

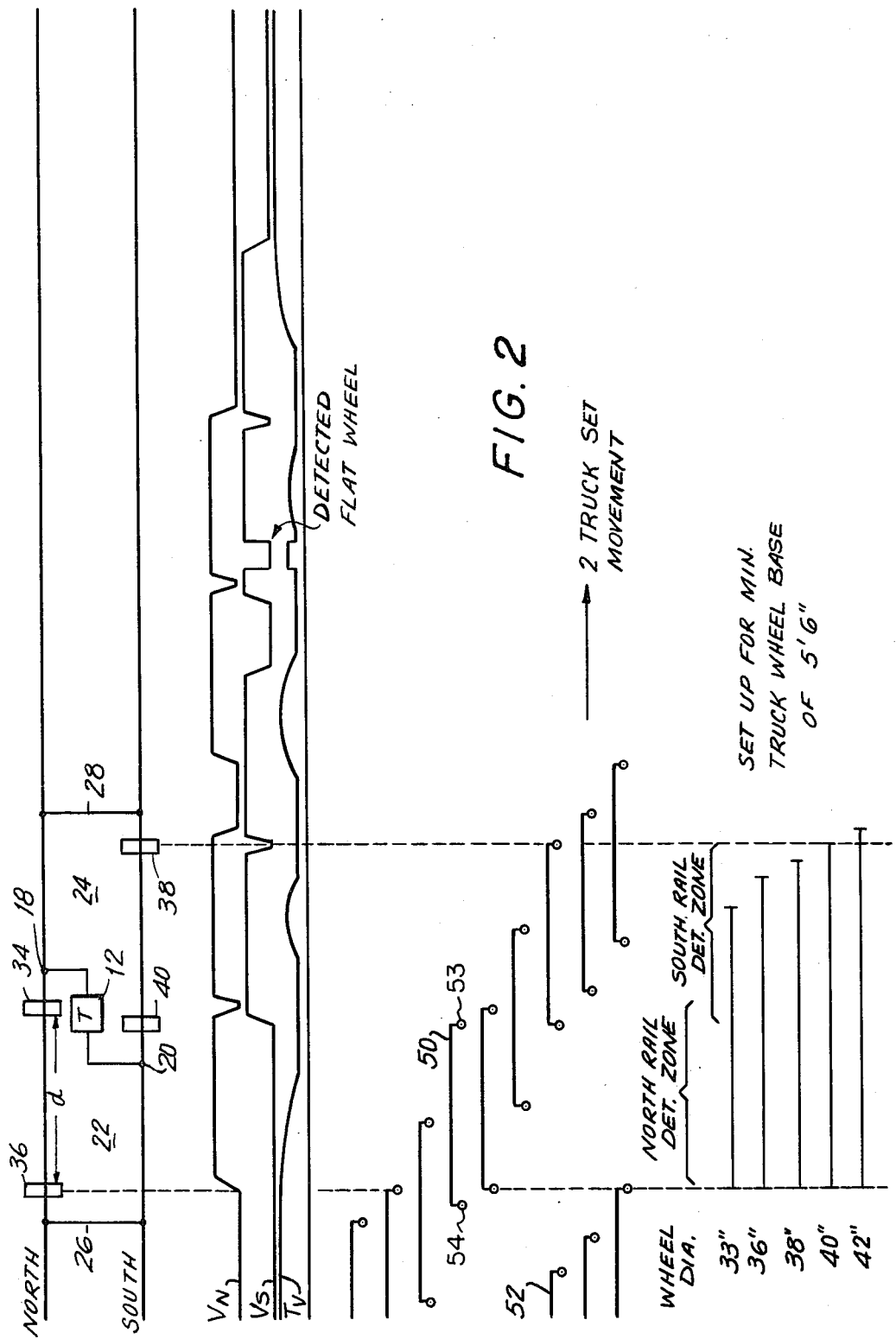

FLAT WHEEL DETECTOR

BACKGROUND, OBJECTS AND SUMMARY OF THE INVENTION

The present invention pertains to detection apparatus and more particularly, to apparatus for detecting the presence of "flat" wheels, i.e., wheels having flat segments, on railroad cars.

A so-called wheel flat results if a wheel of a railroad car or vehicle is so braked or locked that instead of rolling it slides along a rail. When this happens the high friction which develops between the wheel and the rail produces flat segments or portions in the given wheel. It will be understood that the majority of wheel flats appear during the winter because it is at this time that the brake shoes have a tendency to freeze against the wheels which causes the aforesaid sliding and the development of the wheel flat. Other kinds of brake faults can also result in wheel flats, even during mild weather.

In any event and whatever the cause, wheel flats take a significant economic toll in that they require that axles be taken out of service annually. This is because if the wheel flats are left unattended or not repaired, they can cause extensive and serious damage to rails.

Accordingly, it will be appreciated that the aforenoted problems make it important to detect such flat wheels on railroad cars so that they may be taken out of service as soon as practicable for repair; and it is a fundamental object of the present invention to accomplish such detection efficiently and economically.

It will be apparent that wheel flats can be detected either manually or by automatic means, the superior way being by automatic means, because manual detection involves time-consuming wheel inspection and it is difficult to detect a wheel flat because the flat segment or portion is quite often not clearly in the view of the inspector, being on the rail or hidden behind equipment.

For an appreciation of the problems associated with the wheel flats and of an automatic means or apparatus for detecting their presence, reference may be made to a publication by L. M. Ericsson entitled THE NEW WHEEL FLAT DETECTOR JUL400, September, 1974. In that publication, a detailed description is given of such automatic means for detecting wheel flats and the system described is based on the premise that at or above a certain train speed, the wheel suspension system does not permit the wheel flat to drop down and make contact with the rail. More specifically, that system recognizes that at low speed a wheel with a flat will continuously maintain contact with the rail even when the segment with the flat is on the rail. On the other hand, if the speed is higher, such as approximately 30 km/h and higher, the wheel flat will momentarily lose contact with the rail and the time that the wheel loses contact is primarily dependent on the length of the wheel flat and the speed of the train.

Furthermore, in accordance with the prior art system, the speed of the train can be determined by measuring the time it takes for a wheel to pass a fixed measuring distance and this distance may be equal to the circumference of the wheel. The following formula then applies $$\boxed{\frac{lp}{L} = \frac{ts}{T} \cdot \Delta}$$

$lp$ = length of wheel flat $L$ = length of measuring distance $\approx$ wheel circumference $ts$ = interruption time $T$ = reference time = time for the wheel to pass the measuring distance $\Delta$ = factor dependent on load and speed The formula states that the relation between the length of the wheel flat and the measuring distance is equal to the relation between the interruption time caused by the wheel flat and the passage time over the measuring distance multiplied by a factor $\Delta$. The factor $\Delta$ is a function of the weight and speed.

In order to be able to calculate $lp$, it is necessary to have a fixed measuring distance $L$ and measure the interruption time and the passage time. The measuring distance $L$ is limited by rail mounted wheel detectors for measuring the passage time.

In a simplified version of the prior art system, a voltage applied across the rails from a transmitter is sensed by a receiver and as long as no wheel is inside the measuring distance $L$ the voltage level at the receiver is high. However, when a pair of wheels enters the measuring distance, the voltage is shunted out and consequently the voltage level at the receiver decreases. If one of the passing wheels has a wheel flat and the speed is so high that the wheel loses contact with the rail, the voltage will momentarily increase to a high level. Therefore, it will be appreciated that, in simplified terms, a shunting effect is produced by the presence of passing wheels with an attendant relatively low voltage, but that the voltage will rise for a brief period during the time that a wheel flat is sensed. Not specifically shown in the aforenoted publication is the fact that the high receive level during the passage of a wheel flat may not be a very high level due to the loading effect of adjacent axles.

By measuring the relationship between the time period during which the aforesaid increase in voltage is obtained and the total time during which the transmitter has been shunted out, then the relation between the wheel flat length lp and the measuring distance L in accordance with the previously noted formula can be calculated.

However, it turns out that in practice with conventional bogies or trucks on railroad cars, the distance between the pair of wheels on the truck is between 5.5 feet and 9.3 feet, the wheel circumference being about 9.4 feet since the diameter is approximately 36 inches. The problem here is that both pair of wheels may occupy the measuring section simultaneously when the distance between the pair is equal to, or less than, the wheel circumference. Consequently a wheel flat on one of the wheel pairs would then be shunted out by the other pair of the truck and would never be discovered.

Accordingly, what is done in the prior art system as described in the article cited is that the measuring distance is divided into two equal halves or subsections, each being approximately 4.9 feet in length. Moreover, a transmitter or signal source is provided and a receiver is furnished for each of the subsections. The general layout of such a version can be appreciated by reference to FIG. 11 of the aforenoted article. The limits of the two identical subsections are defined by three inductive rail mounted wheel detectors, such detectors also being used to measure the passage time. The complete operation of such prior art system can be understood by reference to FIG. 13 of the same article.

It will be understood from the aforenoted article that the measuring distance L has to be at least as great as the circumference of the largest diameter wheel that is to be measured by the system. Another governing parameter is that one-half of this measuring distance L should be less than the wheel base of the shortest truck, where wheel base refers to the distance between axles on the same truck.

Whatever the merits of the prior art system referred to, it has been found that certain improvements may be realized in accordance with the present invention.

A primary object of the present invention is to insure that no part of the wheel circumference is missed in the operation of the system; that is to say, that all of the wheel circumference is being sensed to determine whether there is a wheel flat present in any part thereof.

It is another primary object of the present invention to minimize the effect of adjacent wheel axle sets from affecting the sensitivity and performance of the flat wheel detection system.

A further object is to avoid "shorting out" of the signal source or transmitter by a wheel axle or axles.

Another specific object is to provide fixed "shorting means" at each end of the measuring section so as to sharply define the measuring section and thus eliminate the loading effects of wheel axles outside of the measurement section.

In fulfilment of the above stated objects, the present invention provides a scheme in which the track is fed with a high frequency source. As the result of the selection of a high frequency, the rails will exhibit a high impedance at those frequencies, thereby minimizing shunting variations and wheel axle loading effects.

Another primary feature resides in the provision of a transmitter or source which is so connected that the rail feed points are staggered. As a result of this arrangement, the aforenoted object is accomplished of preventing the transmitter or source from being completely shorted by an axle. This feature will be fully explained as the description proceeds.

As above described, the scheme of the present invention normally provides a shorting means fixed at each end of the measuring block or section. However, in the case where certain track circuit equipment might be interfered with, the shorting means may be a series inductance-capacitance circuit so that the shorting means will act as a short only to the frequency involved with the present scheme or system.

Other and further objects, advantages and features of the present invention will be understood by reference to the following specification in conjunction with the annexed drawing, wherein like parts have been given like numbers.

BRIEF DESCRIPTION OF THE DRAWING

FIG. 1 is a layout of the flat wheel detection scheme in accordance with the preferred embodiment of the present invention;

FIG. 2 is a combination block diagram and wave diagram which serves both to illustrate the particular pulses or waves as these appear at various points in the system of the invention, and to indicate the position of the wheels of a railroad car relative to the apparatus of the invention.

DESCRIPTION OF PREFERRED EMBODIMENT

Referring now to the figures of the drawing, there will be seen a general layout of the system 10 of the present invention. Included therein is a transmitter or source 12 connected to a pair of rails which for convenience are referenced to points of the compass and are denominated north rail 14 and south rail 16.

It will be particularly noted that the transmitter 12 is so connected that the rail feed points of connection, that is points 18 and 20, are staggered or offset with respect to distance along the respective north and south rails. Because of this arrangement, the transmitter 12 cannot be completely shorted by an axle, it being apparent that a pair of wheels on a given axle cannot coexist precisely at the respective feed points on the rails. Hence, some substantial rail impedance is always present.

It should be noted that there are two separate test sections 22 and 24, each of which is defined intermediately by the connection of the transmitter 12 and at the respective ends by the connection of the shorting means 26 (at the west end) and 28 (at the east end). For convenience, the shorting means has been shown in simplified form but, as has already been indicated, a series L-C circuit can serve as the shorting means, such connection functioning as a short only to the selected frequencies of the present system. It should also be noted that each of the test sections 22 and 24 checks at least half of the wheel circumference of a given passing wheel such that no part of the wheel circumference of any wheel can be missed. This will be evident from referring to the wave diagram of FIG. 2.

The key or primary feature of the present invention includes, as part of the test sections 22 and 24, detection or sensing means 30 and 32, respectively, the first of which includes a pair of coils 34 and 36, the second including a pair of coils 38 and 40. These are more or less conventional current pickup coils which are rail mounted and function to sense the presence of current in the individual rails 14 and 16 respectively. They produce a voltage output proportional to such signal currents in the rails.

It will be seen in FIG. 1 that appropriate approximate distances have been indicated between the pickup coils 34 and 36 in test section 22, such distance of 5½ feet also existing between the other pair of coils 38, 40 in the other test section 24. Also, as indicated, a distance of approximately 3½ feet is provided between the rail feed points 18 and 20.

Turning now to the operation of the system, let it be assumed that there are no trains or axles of any kind in the test area involving the aforenoted sections 22 and 24. Then the transmitter or source 12 sends a current in opposite directions, as indicated, through the track rails. These currents are identified as $I_1$ and $I_2$. The flow of current $I_1$ is sensed by the coils 34 and 36 and, since under these conditions the same current flows by both sense coils, they will produce the same value of output voltage. It will be noted that coils 34 and 36 are interconnected in opposing polarity such that the voltages they produce cancel each other, thereby resulting in an essentially zero output voltage for $V_N$, as indicated on FIG. 1.

It will be understood that any axles which are outside the detection zone defined by coils 34 and 36 may result in increasing or decreasing the current $I_1$, but the output voltage $V_N$ will remain at zero. However, when an axle carrying a pair of wheels rolls between coils 34 and 36 within such detection zone, more current will flow under coil 34 and less current under coil 36 than was the case previously. Consequently, this causes an unbalance which in turn results in an output voltage $V_N$ having a value greater than zero during the entire time that the given axle shunts the rails 14 and 16 as it is passing between coils 34 and 36.

Should a wheel on a particular axle have a flat spot such that it breaks contact with a rail and, in this particular case, with rail 14, the signal or rail current sensed by coils 34 and 36 will momentarily become equal, thereby resulting in a momentary zero output voltage at $V_N$, thus revealing the flat spot. Accordingly, it will be understood that the output voltage returns to the same zero value as formerly when there were no wheels present in the detection zone.

In order to obtain optimum interference-free operation only one axle should be in a test section, for example in test section 22 between coils 34 and 36. As a result, and as aforenoted, the distance between the coils must be not more than the wheel base of the two axles on a truck and, accordingly, this is the reason for the selection of the approximately 5½ feet between coils 34 and 36. As already explained, since the circumference of a wheel exceeds the wheel base of the two axles on a truck, the two test sections 22 and 24 are required to examine the entire circumference of every wheel.

The second test section 24 includes another detection arrangement as already noted involving the coils 38 and 40. These coils function in the same manner as the coils of the first test section. However, it should be noted that the detection scheme here overlaps the detection scheme in the first section by about a half foot. It should also be noted that the fixed shorting means or shunts 26 and 28 which are located at the boundaries of the measuring or test area, not only minimizes the effects of other axles but also of changing ballast resistance.

The output voltage $V_N$ will remain relatively constant as the given axle travels between coil 36 and coil 34; likewise, for $V_S$ as the given axle travels between coil 40 and coil 38. When the first axle enters the test section from the left and passes coil 36, the transmitter voltage will be high and the series rail impedance to the shunting axle will likewise be high. Normally, as the axle rolls toward the transmitter, the shunting impedance decreases but so would the track voltage. By making the transmitter source impedance very low, the output voltage $V_N$ or $V_S$ can be made to remain relatively constant for the reasons mentioned.

As indicated hereinabove, the use of a high frequency source for the transmitter 12 reduces shunting variations. If a minimum period of shunt loss is required to detect flat wheels, this minimum shunt time will be in most cases substantially longer than variations in $V_N$ or $V_S$ due to slight shunting variations or rolling shunt noise.

Referring now to FIG. 2, there are illustrated therein the various output wave forms for $V_N$ achieved when two adjacent trucks 50 and 52 pass through the measuring or testing section. Each of the adjacent trucks carries two pairs of wheels and these are depicted toward the bottom of FIG. 2, and each pair has been designated 53 and 54. This figure also illustrates that trucks with a minimum wheel base of 5½ feet and wheel diameters up to 40 inches can be one hundred percent examined. Wheel diameters of 42 inches, as indicated at the bottom of the figure, will have about 96% of its total circumference examined. Wheel diameters above 38 inches are not used on freight cars. Also, there is indicated on the wave forms illustrated, the particular parts of the wave form that pertain to the particular halves of the individual wheel or pairs of wheels. Thus it will be appreciated that the north rail detection zone examines or detects that first half of the circumference of a given wheel or pair and the south rail detection zone is examining or sensing the other half of that circumference.

There has been disclosed herein a unique and efficient flat wheel detection system which features the connection of a transmitter of the system to rail feed points in a staggered manner such that the transmitter can never be completely or thoroughly shorted by an axle. Hence, there is no "dead spot" produced. Moreover, such stagger arrangement insures that the entire wheel circumference can be examined for wheel flats because of the overlap of the two test sections involved. An additional benefit of the feed point stagger arrangement is to eliminate interference with the closely spaced or adjacent current pickup coils by the rail feed lines.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A system for detecting flat wheels on railroad cars, comprising
   a transmitter having a high frequency output;
   a pair of closed loops defining a pair of individual test sections for a measuring or testing area; said loops including portions of a pair of rails, and shorting means connected between said rails and defining end boundaries for said respective test sections, such that a high frequency current of substantially fixed magnitude normally flows in each loop through said respective shorting means when a wheel axle is absent from the corresponding test section;
   means for connecting said transmitter to said rails, said means including a staggered arrangement so as to produce overlap of said two test sections;
   a detection device in each loop for sensing the individual current flow in each loop and for providing, responsive to the presence of an axle in the respective test sections, a relatively high voltage output which differs substantially from an essentially zero voltage output in the absence of an axle therein.

2. A system as defined in claim 1, in which a first of said detection devices includes a pair of pickup coils, connected in opposed polarities, for sensing the flow of current in a first of said pair of closed loops, and a second detection device which includes another pair of pickup coils, connected in opposed polarities, for sensing the flow of current in said other closed loop.

3. A system as defined in claim 1, in which the presence of a flat wheel in one of said test sections results in a net zero voltage from the corresponding one of said detection devices.

4. A system as defined in claim 2, in which pickup coils in the two different loops are longitudinally offset such that said relatively high voltage indicative of the presence of an axle in said second test section is sensed before the termination of the sensing of such high voltage in said first test section.

5. A system as defined in claim 1, in which said transmitter has an output having a frequency between approximately 10 and 200 KHz.

* * * * *